US011319068B2

(12) United States Patent
McGeer et al.

(10) Patent No.: US 11,319,068 B2
(45) Date of Patent: May 3, 2022

(54) APPARATUS AND METHOD FOR AUTOMATED LAUNCH, RETRIEVAL, AND SERVICING OF A HOVERING AIRCRAFT

(71) Applicant: Aerovel Corporation, Bingen, WA (US)

(72) Inventors: Brian T. McGeer, Underwood, WA (US); Kristoffer Gauksheim, White Salmon, WA (US); Rutger Engbersen, Hood River, OR (US); Andrew Crafts, Hood River, OR (US); Michael Baxter, Hood River, OR (US)

(73) Assignee: Aerovel Corporation, Bingen, WA (US)

( * ) Notice: Subject to any disclaimer, the term of this patent is extended or adjusted under 35 U.S.C. 154(b) by 469 days.

(21) Appl. No.: 16/519,843

(22) Filed: Jul. 23, 2019

(65) Prior Publication Data

US 2019/0367168 A1    Dec. 5, 2019

Related U.S. Application Data

(62) Division of application No. 14/793,397, filed on Jul. 7, 2015, now Pat. No. 10,414,493.

(Continued)

(51) Int. Cl.
*B64C 39/02* (2006.01)

(52) U.S. Cl.
CPC ...... *B64C 39/024* (2013.01); *B64C 2201/088* (2013.01); *B64C 2201/182* (2013.01)

(58) Field of Classification Search
CPC .......... B64C 2201/182; B64C 2201/08; B64C 2201/088

(Continued)

(56) References Cited

U.S. PATENT DOCUMENTS

| 968,339 A | 8/1910 | Geraldson |
| 1,144,505 A | 6/1915 | Steffan |

(Continued)

FOREIGN PATENT DOCUMENTS

| CA | 781808 | 4/1968 |
| CA | 839101 | 4/1970 |

(Continued)

OTHER PUBLICATIONS

A miniature powerplant for very small, very long range autonomous aircraft, S.P. Hendrickson and T. McGeer, Final Report under U.S. DoE contract No. DE-FG03-96ER82187, Sep. 1999, (23 pp.).

(Continued)

*Primary Examiner* — Christopher P Ellis
(74) *Attorney, Agent, or Firm* — Neal, Gerber & Eisenberg LLP

(57) ABSTRACT

An apparatus and method for automated launch, retrieval, and servicing of a hovering aircraft is provided. The apparatus includes a line which is elevatable while maintaining a principally horizontal axis. For retrieval, the aircraft translates principally spanwise over the line, following a path which is principally horizontal and normal to the line. At an appropriate moment, the line is elevated and contacts the aircraft's wing. As the aircraft continues translating, the line slides along the wing until captured in a cleat. The aircraft is then stably tethered in hover, and its position can be manipulated by articulating the line, such as to guide the aircraft into a docking station. For launch the aircraft lifts itself into hover while tethered to the line. Articulation of the line guides the aircraft into a launch position, at which point the line is disconnected from the cleat, thereby releasing the aircraft.

4 Claims, 13 Drawing Sheets

Related U.S. Application Data

(60) Provisional application No. 62/023,555, filed on Jul. 11, 2014.

(58) Field of Classification Search
USPC .......................................................... 244/63
See application file for complete search history.

(56) References Cited

U.S. PATENT DOCUMENTS

| | | | |
|---|---|---|---|
| 1,306,860 A | 6/1919 | Smith | |
| 1,383,595 A | 7/1921 | Black | |
| 1,499,472 A | 7/1924 | Pratt | |
| 1,582,188 A | 4/1926 | Mummert | |
| 1,625,020 A | 4/1927 | Guillermo | |
| 1,686,298 A | 10/1928 | Uhl | |
| 1,716,670 A | 6/1929 | Sperry | |
| 1,731,091 A | 10/1929 | Clayton | |
| 1,748,663 A | 2/1930 | Tucker | |
| 1,836,010 A | 12/1931 | Audrain | |
| 1,848,828 A | 3/1932 | Griffin | |
| 1,912,723 A | 6/1933 | Perkins | |
| 2,415,071 A | 2/1947 | Brie | |
| 2,435,197 A | 2/1948 | Brodie | |
| 2,440,574 A | 4/1948 | Cotton | |
| 2,448,209 A | 8/1948 | Boyer et al. | |
| 2,479,125 A * | 8/1949 | Leonard | B64C 29/0075 244/7 B |
| 2,488,050 A | 11/1949 | Brodie | |
| 2,488,051 A | 11/1949 | Brodie | |
| 2,552,115 A * | 5/1951 | Replogle | B64C 29/0091 244/1 OOR |
| 2,807,429 A | 9/1957 | Hawkins, Jr. et al. | |
| 2,843,337 A | 7/1958 | Bennett | |
| 2,944,815 A | 7/1960 | Moyer | |
| 3,029,049 A | 4/1962 | Melville | |
| 3,146,974 A | 9/1964 | Petoia | |
| 3,351,325 A | 11/1967 | Cotton | |
| 3,389,880 A | 6/1968 | Ferguson | |
| 3,785,316 A | 1/1974 | Leming et al. | |
| 3,980,259 A | 9/1976 | Greenhalgh et al. | |
| 4,079,901 A | 3/1978 | Mayhew et al. | |
| 4,116,408 A | 9/1978 | Soloy | |
| 4,123,020 A | 10/1978 | Korsak | |
| 4,147,317 A | 4/1979 | Mayhew et al. | |
| 4,311,290 A | 1/1982 | Koper | |
| 4,523,729 A | 6/1985 | Frick | |
| 4,575,026 A | 3/1986 | Brittain et al. | |
| 4,680,962 A | 7/1987 | Durbin | |
| 4,753,400 A | 6/1988 | Reuter et al. | |
| 4,757,959 A | 7/1988 | Schroder et al. | |
| 4,786,014 A * | 11/1988 | Pesando | B64F 1/12 244/115 |
| 4,790,497 A | 12/1988 | Yoffe | |
| 4,842,222 A | 6/1989 | Baird | |
| 5,000,398 A | 3/1991 | Rashev | |
| 5,039,034 A | 8/1991 | Burgess et al. | |
| 5,042,750 A | 8/1991 | Winter | |
| 5,054,717 A | 10/1991 | Taylor | |
| 5,092,540 A | 3/1992 | Burgess et al. | |
| 5,687,930 A | 11/1997 | Wagner et al. | |
| 5,799,900 A * | 9/1998 | McDonnell | B64C 29/02 244/7 A |
| 5,806,795 A | 9/1998 | Ortelli | |
| 6,264,140 B1 | 7/2001 | McGeer et al. | |
| 6,824,102 B2 | 11/2004 | Haggard | |
| 6,874,729 B1 | 4/2005 | McDonnell | |
| 6,961,018 B2 | 11/2005 | Heppe et al. | |
| 7,028,947 B2 | 4/2006 | Burns | |
| 7,066,430 B2 | 6/2006 | Dennis et al. | |
| 7,097,137 B2 | 8/2006 | McDonnell | |
| 7,104,495 B2 | 9/2006 | McGeer | |
| 7,121,507 B2 | 10/2006 | Dennis et al. | |
| 7,140,575 B2 | 11/2006 | McGeer et al. | |
| 7,143,974 B2 | 12/2006 | Roeseler et al. | |
| 7,143,976 B2 | 12/2006 | Snediker et al. | |
| 7,152,827 B2 | 12/2006 | McGeer | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,264,204 B1 | 9/2007 | Portmann | |
| 7,344,108 B2 | 3/2008 | Muylaert et al. | |
| 7,360,741 B2 | 4/2008 | McGeer et al. | |
| 7,410,125 B2 | 8/2008 | Steele | |
| 7,464,650 B2 | 12/2008 | Steinkerchner et al. | |
| 7,510,145 B2 | 3/2009 | Snediker | |
| 7,530,527 B2 | 5/2009 | Kelleher | |
| 7,543,780 B1 | 6/2009 | Marshall et al. | |
| 7,562,843 B2 | 7/2009 | Lipponen | |
| 7,665,691 B2 | 2/2010 | Hanzlick et al. | |
| 7,712,702 B2 | 5/2010 | McGeer et al. | |
| 7,954,758 B2 | 6/2011 | McGeer et al. | |
| 8,162,256 B2 | 4/2012 | Goossen et al. | |
| 8,172,177 B2 | 5/2012 | Lovell et al. | |
| 8,231,083 B2 | 7/2012 | Kutzmann et al. | |
| 8,245,968 B2 | 8/2012 | McGeer et al. | |
| 8,276,844 B2 | 10/2012 | Kariv | |
| 8,292,215 B2 | 10/2012 | Olm et al. | |
| 8,313,057 B2 | 11/2012 | Vasilievich | |
| 8,348,193 B2 | 1/2013 | McGeer et al. | |
| 8,453,966 B2 | 6/2013 | McGeer et al. | |
| 8,464,981 B2 * | 6/2013 | Goldie | B64F 1/027 244/110 E |
| 8,573,536 B2 | 11/2013 | McGeer et al. | |
| 8,596,576 B1 | 12/2013 | McGeer et al. | |
| 8,672,264 B1 | 3/2014 | McGeer et al. | |
| 8,708,277 B1 | 4/2014 | McGeer et al. | |
| 8,708,278 B2 | 4/2014 | McGeer et al. | |
| 8,714,482 B2 | 5/2014 | McGeer et al. | |
| 8,740,134 B2 | 6/2014 | Suzuki | |
| 8,740,142 B2 | 6/2014 | McGeer et al. | |
| 8,944,373 B2 | 2/2015 | Dickson et al. | |
| 8,950,698 B1 | 2/2015 | Rossi | |
| 8,955,800 B2 | 2/2015 | McGeer et al. | |
| 8,955,801 B2 | 2/2015 | McGeer et al. | |
| 9,004,402 B2 | 4/2015 | McGeer et al. | |
| 9,193,481 B2 | 11/2015 | McGeer et al. | |
| 9,434,481 B2 | 9/2016 | McGeer | |
| 9,896,222 B2 * | 2/2018 | Kunz | B64F 1/029 |
| 10,611,498 B2 * | 4/2020 | Schweighart | B64C 39/024 |
| 10,618,676 B2 * | 4/2020 | Chen | B64F 1/0295 |
| 10,836,509 B2 * | 11/2020 | McGrew | B64C 27/08 |
| 10,988,257 B2 * | 4/2021 | von Flotow | B64C 27/14 |
| 11,066,184 B2 * | 7/2021 | Wyrobek | B64F 1/04 |
| 11,066,185 B2 * | 7/2021 | Dennis | B64F 1/10 |
| 11,142,339 B2 * | 10/2021 | Dennis | B64C 39/024 |
| 2002/0100838 A1 | 8/2002 | McGeer et al. | |
| 2003/0222173 A1 | 12/2003 | McGeer et al. | |
| 2004/0256519 A1 | 12/2004 | Ellis et al. | |
| 2005/0133665 A1 | 6/2005 | Dennis | |
| 2009/0314883 A1 * | 12/2009 | Ariton | F41A 23/34 244/63 |
| 2012/0223182 A1 | 9/2012 | Gilchrist et al. | |
| 2013/0082137 A1 | 4/2013 | Gundlach et al. | |
| 2013/0161447 A1 * | 6/2013 | McGeer | B64F 1/22 244/11 OF |
| 2013/0320138 A1 | 12/2013 | Dickson | |
| 2014/0263852 A1 | 9/2014 | Walker et al. | |
| 2015/0129716 A1 * | 5/2015 | Yoffe | B64F 1/0297 244/110 C |
| 2015/0314871 A1 | 11/2015 | Von Flotow | |
| 2016/0152339 A1 | 6/2016 | von Flotow | |
| 2016/0327945 A1 | 11/2016 | Davidson | |
| 2016/0347477 A1 * | 12/2016 | Tully | B64F 1/08 |
| 2017/0158340 A1 * | 6/2017 | von Flotow | B64C 25/10 |
| 2017/0253350 A1 | 9/2017 | von Flotow | |
| 2018/0050823 A1 | 2/2018 | McGeer | |
| 2021/0171217 A1 * | 6/2021 | Brown | B64C 31/06 |

FOREIGN PATENT DOCUMENTS

| | | |
|---|---|---|
| CN | 204822072 | 12/2015 |
| EP | 0 472 613 | 4/1992 |

(56) References Cited

FOREIGN PATENT DOCUMENTS

| EP | 2 186 728 | 5/2010 | |
|---|---|---|---|
| EP | 3564124 A1 * | 11/2019 | .............. B64F 1/029 |
| GB | 2 071 031 | 9/1981 | |
| WO | WO 2001/07318 | 2/2001 | |
| WO | WO 2008/015663 | 2/2008 | |
| WO | WO 2013/171735 | 11/2013 | |
| WO | WO 2014/0204550 | 12/2014 | |
| WO | WO 2016/0167849 | 10/2016 | |

OTHER PUBLICATIONS

Aerosonde hazard estimation, T. McGeer, 1994, (6 pp).
Aerosonde Pacific reconnaissance: ready when you are!, T. McGeer, Pacific Northwest Weather Workshop, Mar. 2005, (15 pp).
An Airspeed Vector Sensor for V/STOL Aircraft, E. J. Durbin and T. McGeer, Journal of Aircraft, vol. 19 No. 6, Jun. 1982, (7 pp).
Automated Launch, Recovery, and Refueling for Small Unmanned Aerial Vehicles, K. Mullens et al., 2004 (11 pp).
Autonomous Aerosondes for Economical Atmospheric Soundings Anywhere on the Globe, G. J. Holland, T. McGeer and H.H. Youngre, Bulletin of the American Meteorological Society, vol. 73 No. 12, Dec. 1992 (12 pp).
Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).
Laima: The First Atlantic Crossing by Unmanned Aircraft, T. McGeer, Feb. 1999, (25 pp).
Mini-RPV Recovery System Conceptual Study, Prepared for Eustis Directorate U.S. Army Air Mobility Research and Development Laboratory, Aug. 1977 (322 pages).
Quantitative Risk Management as a Regulatory Approach to Civil UAVs, T. McGeer, L. Newcombe, and J. Vagners, International Workshop on UAV Certification, Jun. 1999, (11 pp).
Regulatory Issues Involving Long-Range Weather Observation by Aerosonde Autonomous Aircraft, T. McGeer, Oct. 1998, (8 pp).
Rotary Action, description of scene of License to Kill, available at http://www.rotaryaction.com/pages/licetkil.html (2 pp).
Safety, Economy, Reliability and Regulatory Policy of Unmanned Aircraft, T. McGeer, Mar. 2007, (9 pp).
Skyhook (Harrier handling system); Harpoon Head Quarters; available at http://www.harpoondatabases.com/encyclopedia/Entry2979.aspx; printed Jun. 21, 2013 (3 pages).
The Beartrap—A Canadian Invention, Crowsnest Magazine, vol. 17, No. 3 and 4 [online], Mar.-Apr. 1965, [retrieved on Sep. 14, 2007]. Retrieved from the Internet at <URL: http://www.readyayeready.com/timeline/1960s/beartrap/index.htm>. (4 pp).
Wide-Scale Use of Long-Range Miniature Aerosondes Over the World's Oceans, T. McGeer and J. Vagners, 1999, (25 pp).

* cited by examiner

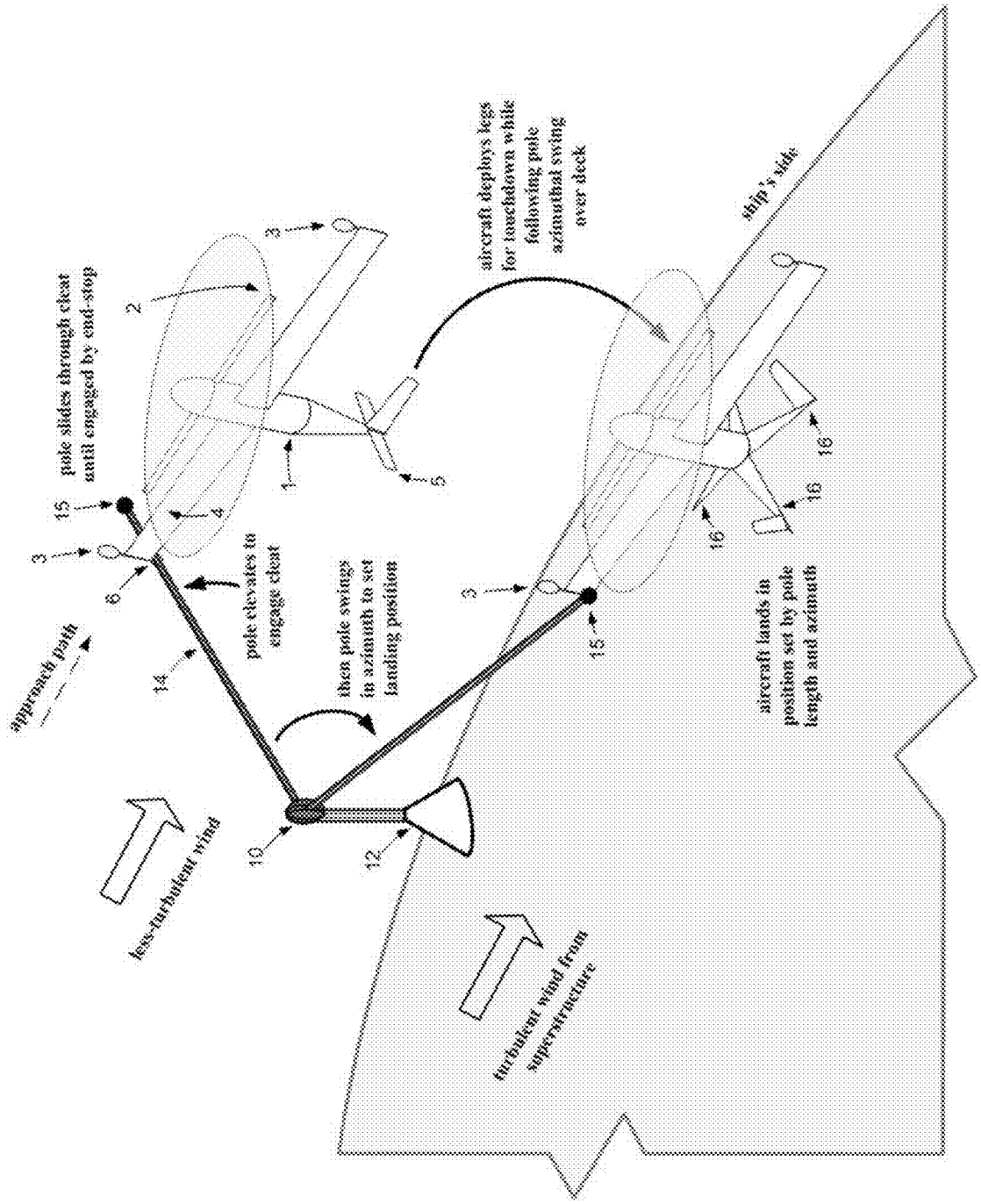

US 11,319,068 B2

APPARATUS AND METHOD FOR AUTOMATED LAUNCH, RETRIEVAL, AND SERVICING OF A HOVERING AIRCRAFT

PRIORITY CLAIM

This patent application is a divisional of, and claims priority to and the benefit of, U.S. patent application Ser. No. 14/793,397, filed on Jul. 7, 2015, which claims priority to and the benefit of U.S. Provisional Patent Application No. 62/023,555, filed on Jul. 11, 2014, the entire contents of which are incorporated herein by reference.

FIELD

The present disclosure generally relates to launch, retrieval, and servicing of a hovering aircraft, especially in turbulent wind or onto an irregularly-moving platform, such as a ship in a rough sea.

BACKGROUND

Hovering aircraft, be they helicopters, thrust-vectoring jets, "tail-sitters," or other types, usually land by gently descending in free thrust-borne flight onto a landing surface, coming to rest on an undercarriage of wheels, skids, or legs. This elementary technique can be problematic in certain situations, as for example when targeting a small, windswept landing pad on a ship moving in a rough sea. The well-known Beartrap or RAST (Stewart & Baekken 1968) as well as the harpoon-and-grid system (Wolters & Reimering 1994) are used by helicopters to permit retrieval with acceptable safety in such conditions. These systems require an expensive and substantial plant in the landing area, as well as manual operations coordinated between helicopter and shipboard crew. Furthermore the helicopter must carry a complete undercarriage in addition to the components necessary for capturing the retrieval apparatus.

Desirable improvements relative to such systems include (a) simplification of base and onboard apparatus, and (b) automated rather than manual operation. Ideally automation encompasses not only retrieval but also subsequent servicing and launch. This is particularly desirable for an unmanned aircraft, whose operations cycle can then be made fully autonomous.

BRIEF DESCRIPTION OF THE FIGURES

FIG. 13 shows a composite of an alternative embodiment of the aircraft retrieval and launch apparatus of the present disclosure, including a lightweight pole in place of the boom and "clothesline." The pole engages a wingtip cleat on the aircraft generally as in FIG. 2. The pole then constrains the radial position of the aircraft relative to the root of the pole, and azimuthal rotation of the pole is used to guide the aircraft to a desired landing point. In this case the rear fuselage of the aircraft opens into a set of legs on which the aircraft rests for landing.

DETAILED DESCRIPTION

The present disclosure provides an apparatus and method for automated launch, retrieval, and servicing of a hovering aircraft. The apparatus and method of the present disclosure are especially suited to unmanned aircraft of small size. The apparatus and method of the present disclosure allow for a fully automated operations cycle, whereby the aircraft can be repeatedly launched, retrieved, serviced, and re-launched, without manual intervention at any point, while requiring only modest accuracy in piloting, with greater simplicity than has previously been achieved, and robustness in rougher conditions.

In one embodiment of the method of the present disclosure, an aircraft would proceed automatically from free thrust-borne flight through retrieval, servicing, and subsequent launch via the following sequence of actions illustrated in FIGS. 1 to 5. For illustration we imagine the operation to be done on a ship while underway.

Figure 1:
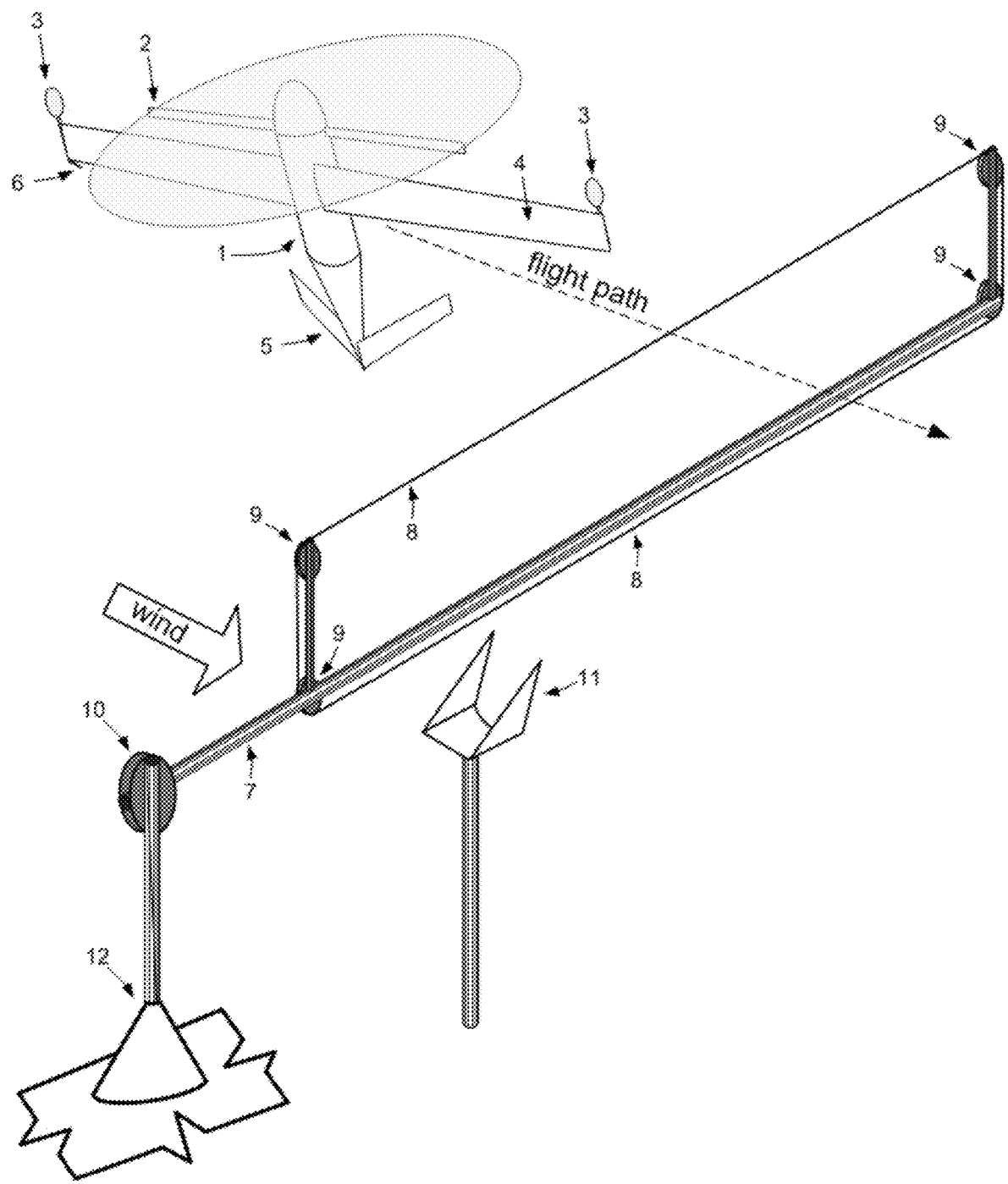
FIG. 1 shows an aircraft approaching an example embodiment of the aircraft retrieval and launch apparatus, in free thrust-borne flight, with the boom and attached "clothesline" of the aircraft retrieval and launch apparatus poised to capture the aircraft.

FIG. 1 shows the aircraft 1 approaching one embodiment of the aircraft retrieval and launch apparatus. The aircraft 1 in this case is supported by a main rotor 2, which controls pitch and yaw with rotor cyclic as in a conventional helicopter. Control in roll, i.e., about the spin axis of the rotor, is effected by thrusters 3 at the tips of the wing 4. The base apparatus meanwhile comprises a boom 7 carrying a line 8 which can be circulated through pulleys 9 like a common clothesline. The line could be any suitable device, such as a cable, a rope, a chain, and the like. The boom can be swung about its base 10 in a principally vertical plane which contains the boom longitudinal axis and the line.

Figure 2:
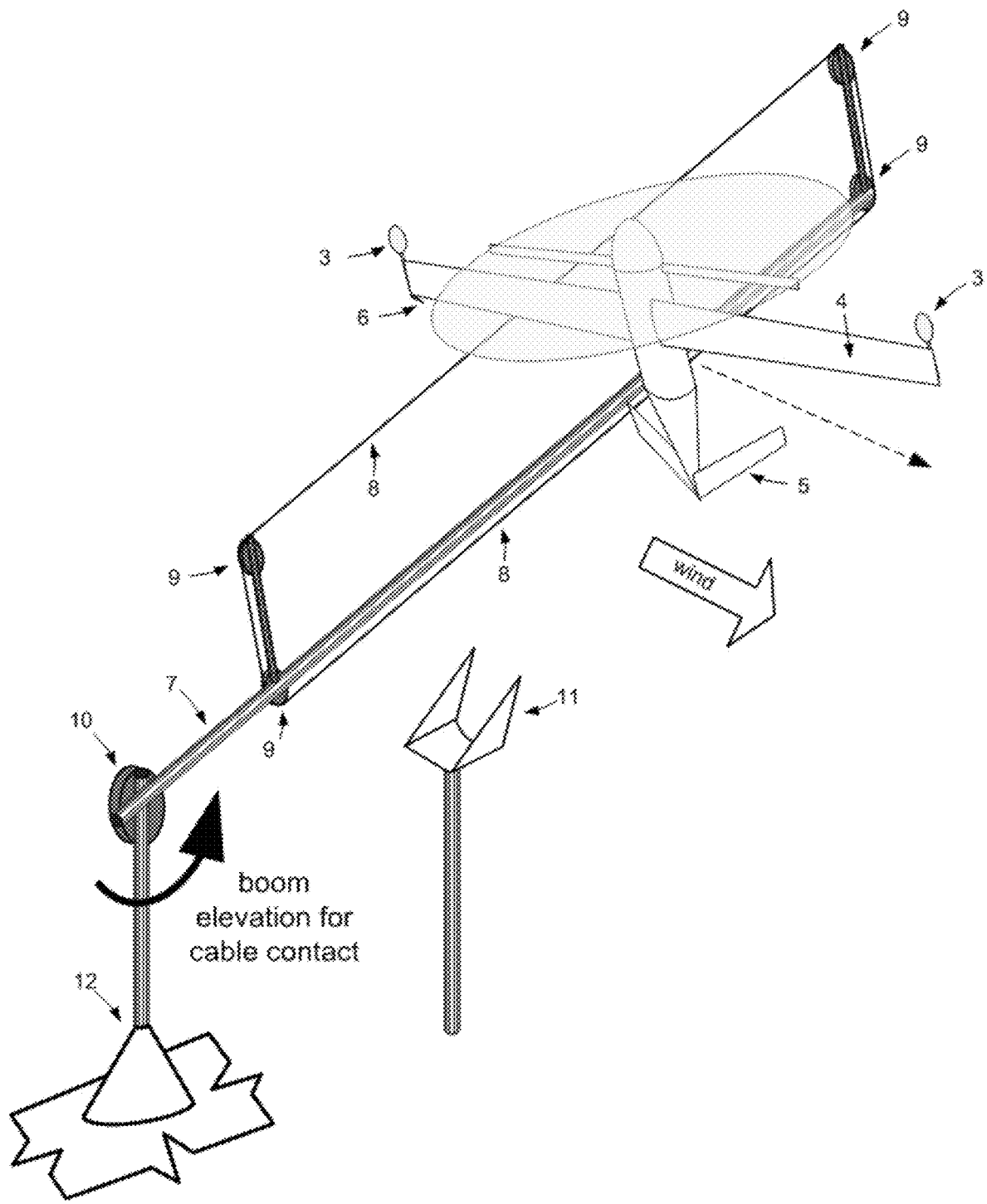
FIG. 2 shows the aircraft retrieval and launch apparatus of FIG. 1 being elevated as the aircraft crosses over the boom, such that the "clothesline" is forced against the trailing edge of the wing and slides toward the wing tip.

In preparation for retrieval, the boom is swung to a low position in a plane approximately normal to the side of the ship. The aircraft flies over the boom with its wing approximately parallel to the side of the ship, and therefore normal to the longitudinal axis of the boom. As the aircraft approaches, the elevation of the boom is regulated so that the boom remains clear of the tail 5, but is poised to elevate soon after the tail of the aircraft passes overhead. At that point, as shown in FIG. 2, the boom is promptly raised (pivoted upward in a vertical plane) so that the line is pushed against the trailing edge of the wing. Continued motion of the aircraft then guides the line along the trailing edge into a cleat 6 or any other suitable capture device, at or near the wing tip. In this embodiment (as opposed to that of FIG. 13) the cleat then prevents further sliding of the line relative to the aircraft.

The position of the cleat relative to the aircraft's mass center is principally spanwise. This location, together with approach such that mass center is downwind of the cleat, confers weathervane stability in roll and yaw when the aircraft is in tethered hover as in FIG. 3. The aircraft should tilt its thrust axis away from the line in order to augment this stabilizing effect, and indeed to allow retrieval from either direction if wind-over-deck is light. In strong wind, by contrast, downwind approach is mandatory, and is practical even in relative wind exceeding the aircraft's maximum horizontal airspeed.

While in this embodiment the boom swings in a principally vertical plane, the aperture for swinging the line against the wing can be increased advantageously by canting the plane such that upward motion of the boom includes a component toward the wing/fuselage junction. In other embodiments, the boom could be articulated about an azimuthal pivot 12 as well as in elevation.

Should the approach become unsatisfactory, the boom should rapidly drop clear of the aircraft, and the aircraft should climb away for another retrieval attempt.

Figure 3:
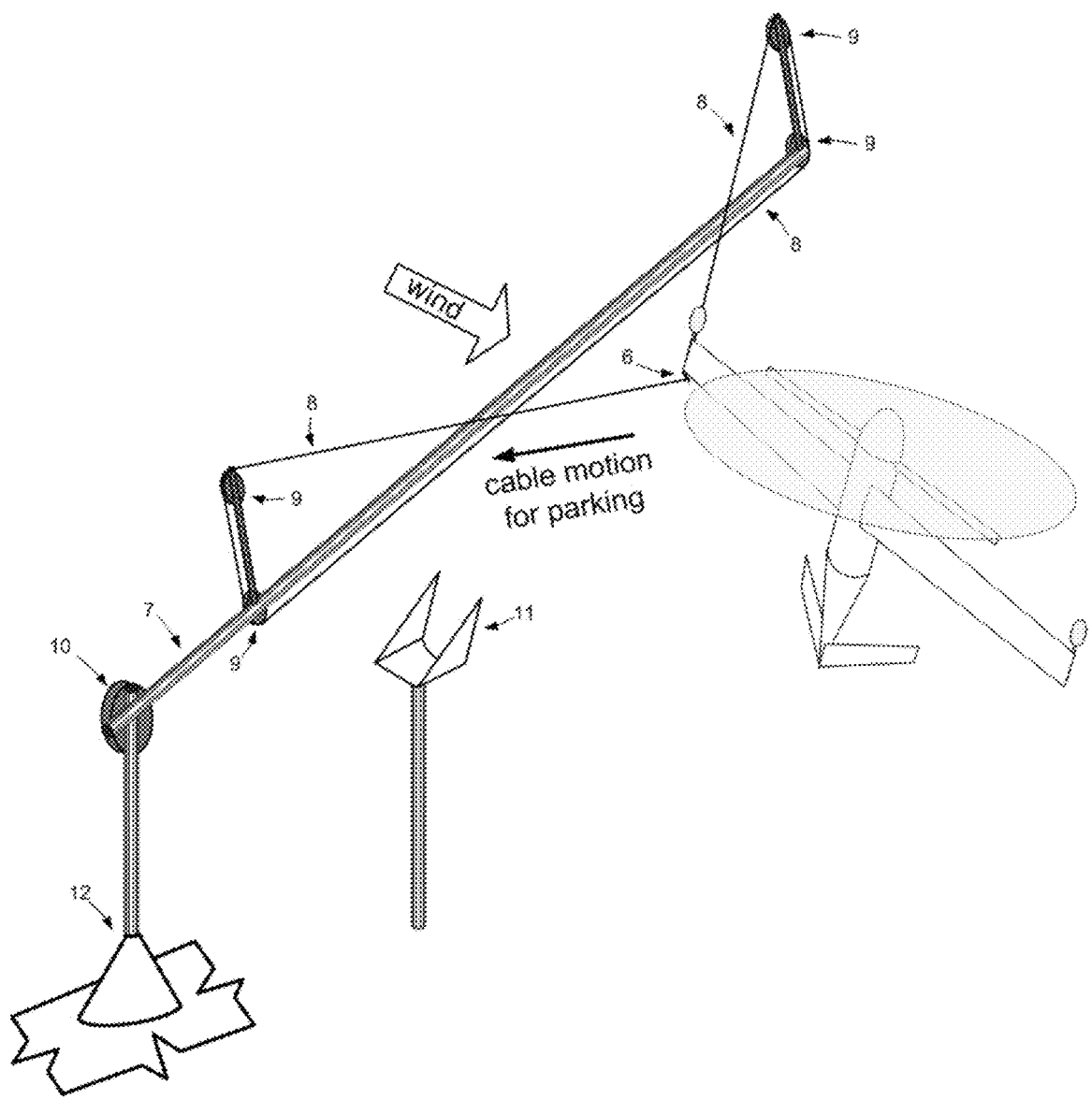
FIG. 3 shows the aircraft attached to the "clothesline" of FIG. 1 by a cleat at the wing tip, while continuing to hover.
Figure 4:
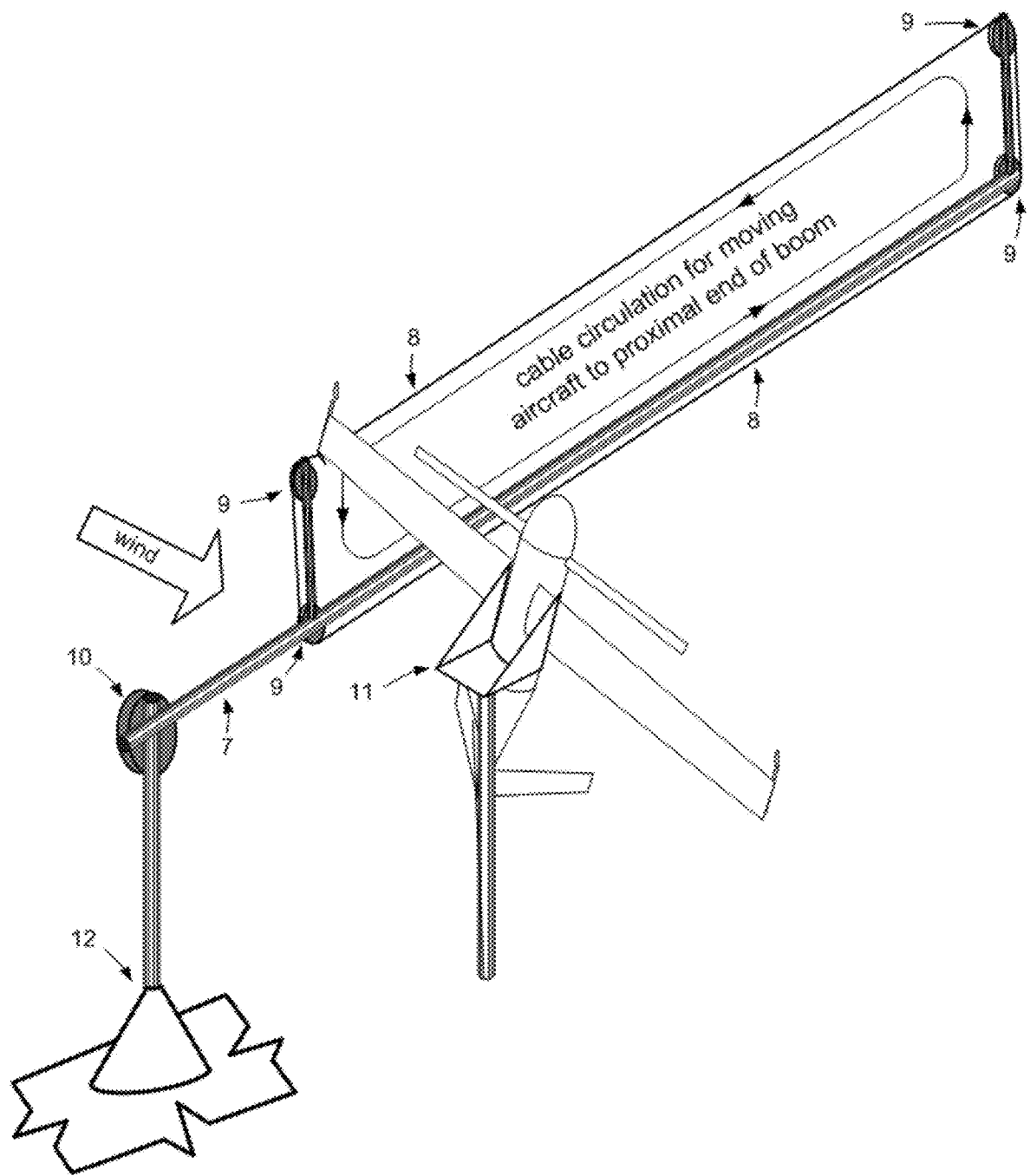
FIG. 4 shows the aircraft parked in a docking station at the proximal end of the boom of FIG. 1, having been guided there by the "clothesline."
Figure 5:
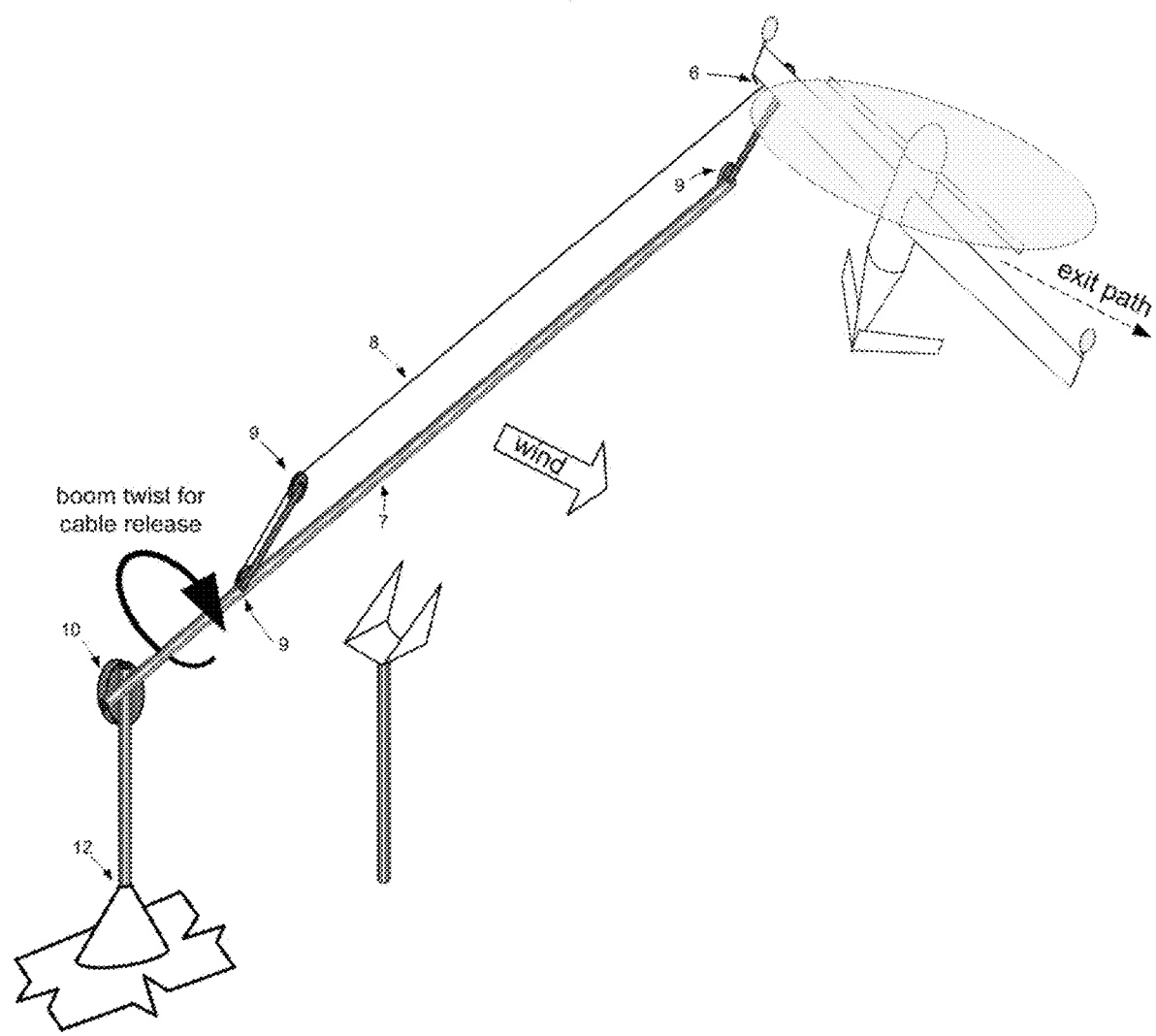
FIG. 5 shows the aircraft being released into free flight from the distal end of the boom of FIG. 1.

Return now to the aircraft, which was last seen cleated to the line as in FIG. 3. The aircraft continues to supports its weight, while regulating attitude and altitude such that the wing is near-spanwise to the boom longitudinal axis, and the thrust vector pulls away from the boom. Meanwhile the line is circulated as shown in FIG. 4 so that the aircraft is drawn to a docking station 11 near the base of the boom. A combination of guiding surfaces and boom articulation align the aircraft as it approaches the docking station, such that a locking mechanism can then secure the aircraft in a well-constrained position as in FIG. 4. The aircraft can then shut down. Connections can be made for fuel, electrical power, or other services.

After servicing, the engine of the aircraft can be started for launch. The well-constrained aircraft position facilitates use of an external starter. The engine can then be run-up, both to verify that sufficient thrust is available for climb in the prevailing conditions, and to measure, approximately, the appropriate power setting for hover. This may be done by allowing the aircraft limited vertical freedom in the docking station, with contact switches or other sensors to indicate when the aircraft is at one or another travel limit.

For launch the aircraft sets the approximate hover power, the docking fixture opens, the aircraft lifts out of the dock, and the line circulates to translate the aircraft toward the distal end of the boom. The aircraft meanwhile regulates attitude and altitude as during retrieval. The aircraft can remain indefinitely in tethered hover. In particular, the engine power used for tethered hover can be observed for a period sufficient to infer climb rate achievable in free flight. If the estimated rate is unsatisfactory, then the aircraft can be returned to the docking station.

If power is satisfactory for free flight, then release should be done when the aircraft is at the distal end of the boom, since this maximizes clearance from the ship. One of many techniques for release is to jerk the line toward the aircraft, for example by rotating the boom sharply about its longitudinal axis as in FIG. 5. This pops the line out of an open-jawed cleat, the relatively large inertia of the aircraft preventing it from following the fast line acceleration.

Upon release the aircraft translates rapidly downwind. This motion can be recognized promptly, at which point the aircraft switches to free-flight control. It can then proceed on its mission, and ultimately return to base for another retrieval. The full operations cycle of the aircraft can thus be performed without manual intervention.

Figure 6:
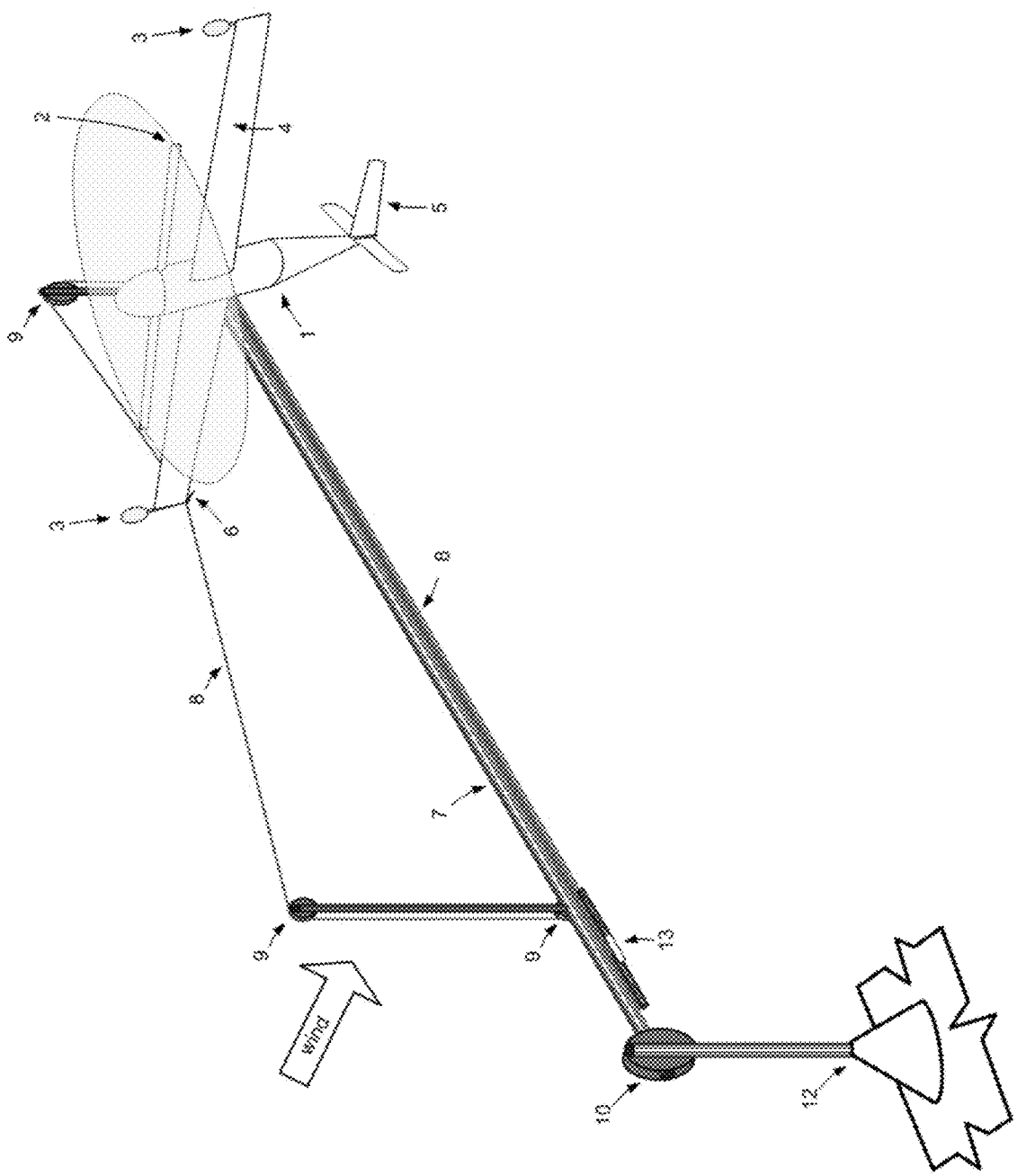
FIG. 6 shows an alternative embodiment of the aircraft retrieval and launch apparatus of the present disclosure, with an aircraft hovering after flying an approach and capturing the "clothesline" as in FIG. 1 through FIG. 3.
Figure 7:
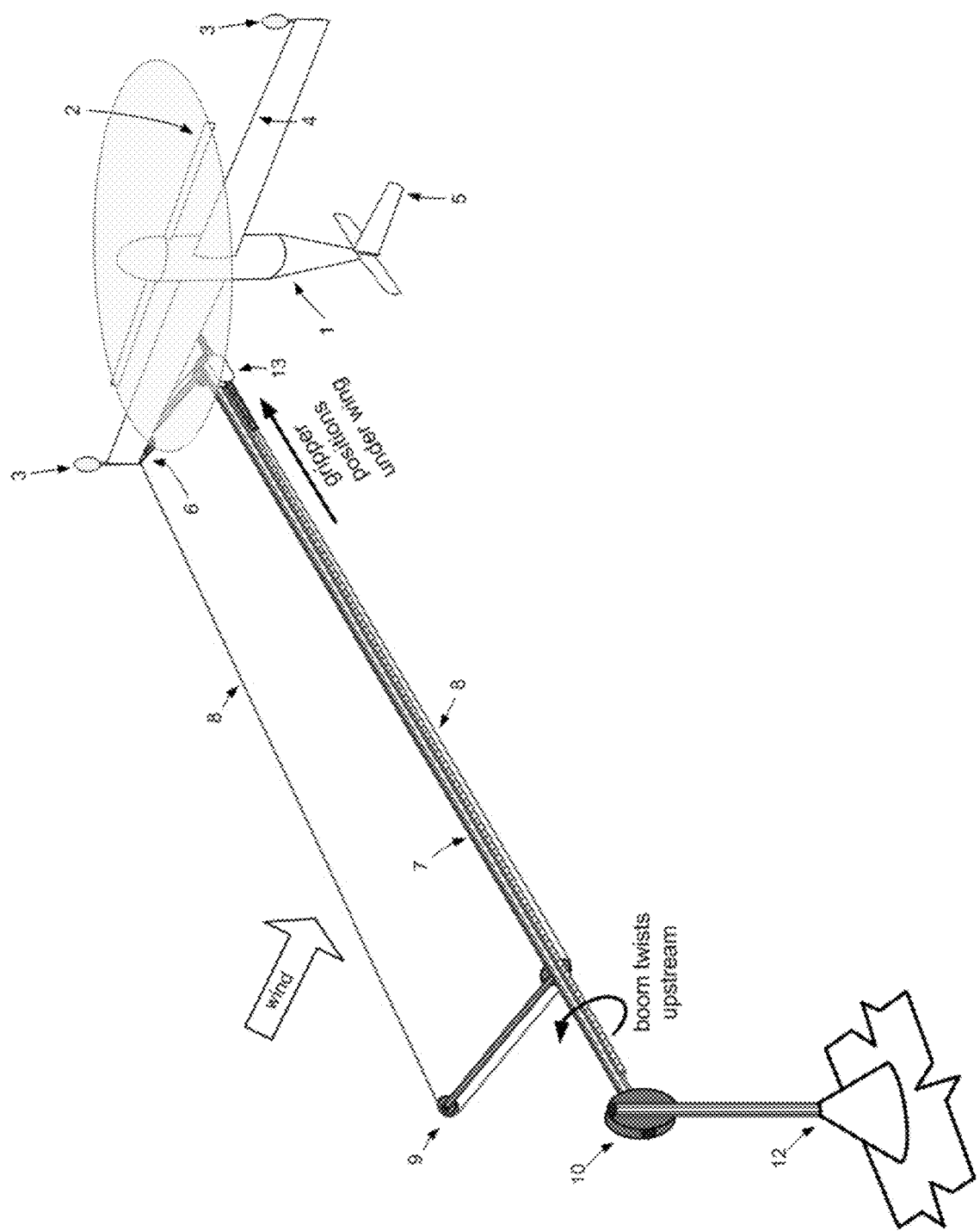
FIG. 7 shows the aircraft at the distal end of the boom of FIG. 6, with the boom having twisted about its axis to bring the wing of the aircraft close to the boom, and a wing gripper having been put in position to grasp the wing.
Figure 8:
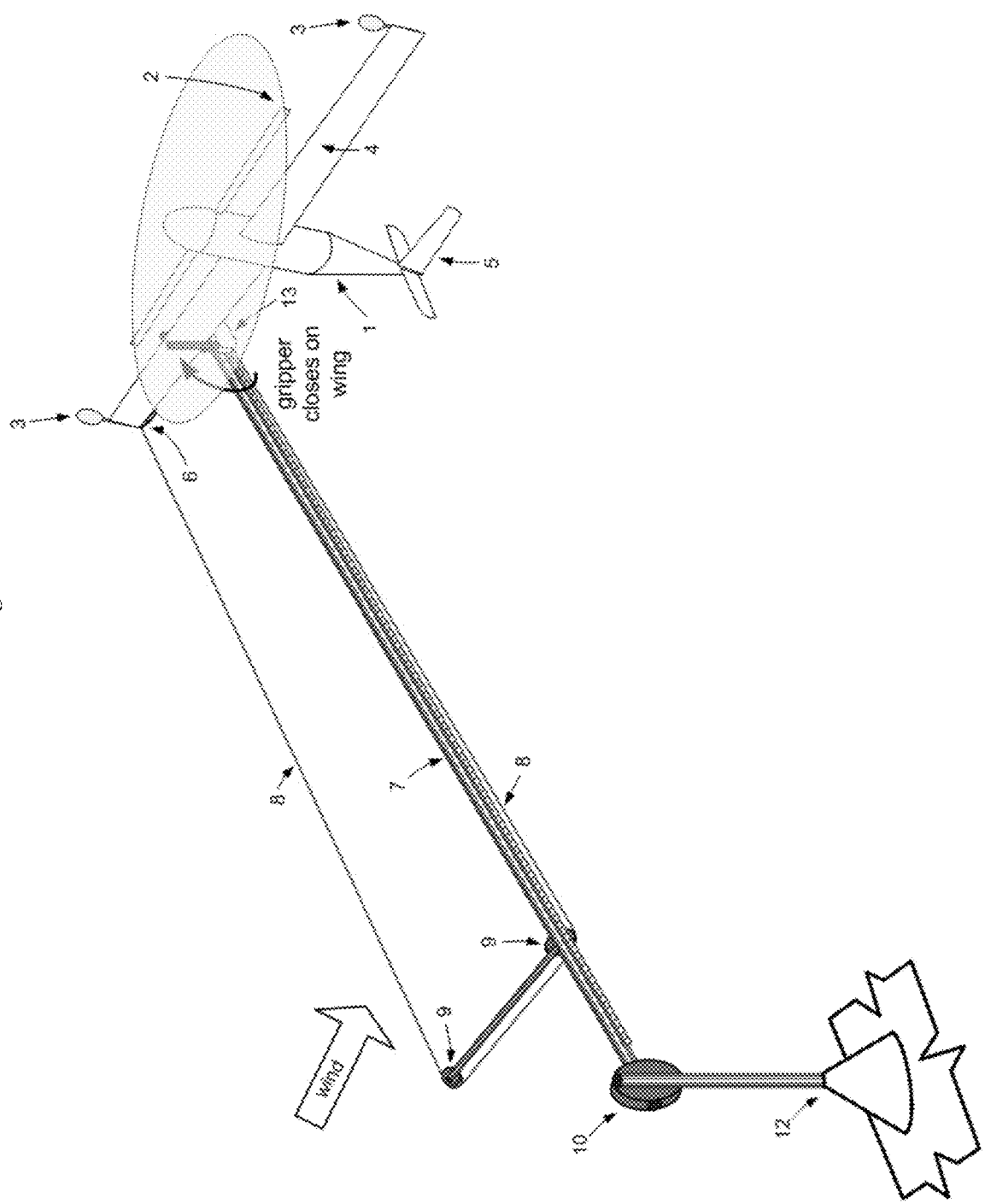
FIG. 8 shows the gripper of FIG. 6 having grasped the wing, thus constraining the aircraft.
Figure 9:
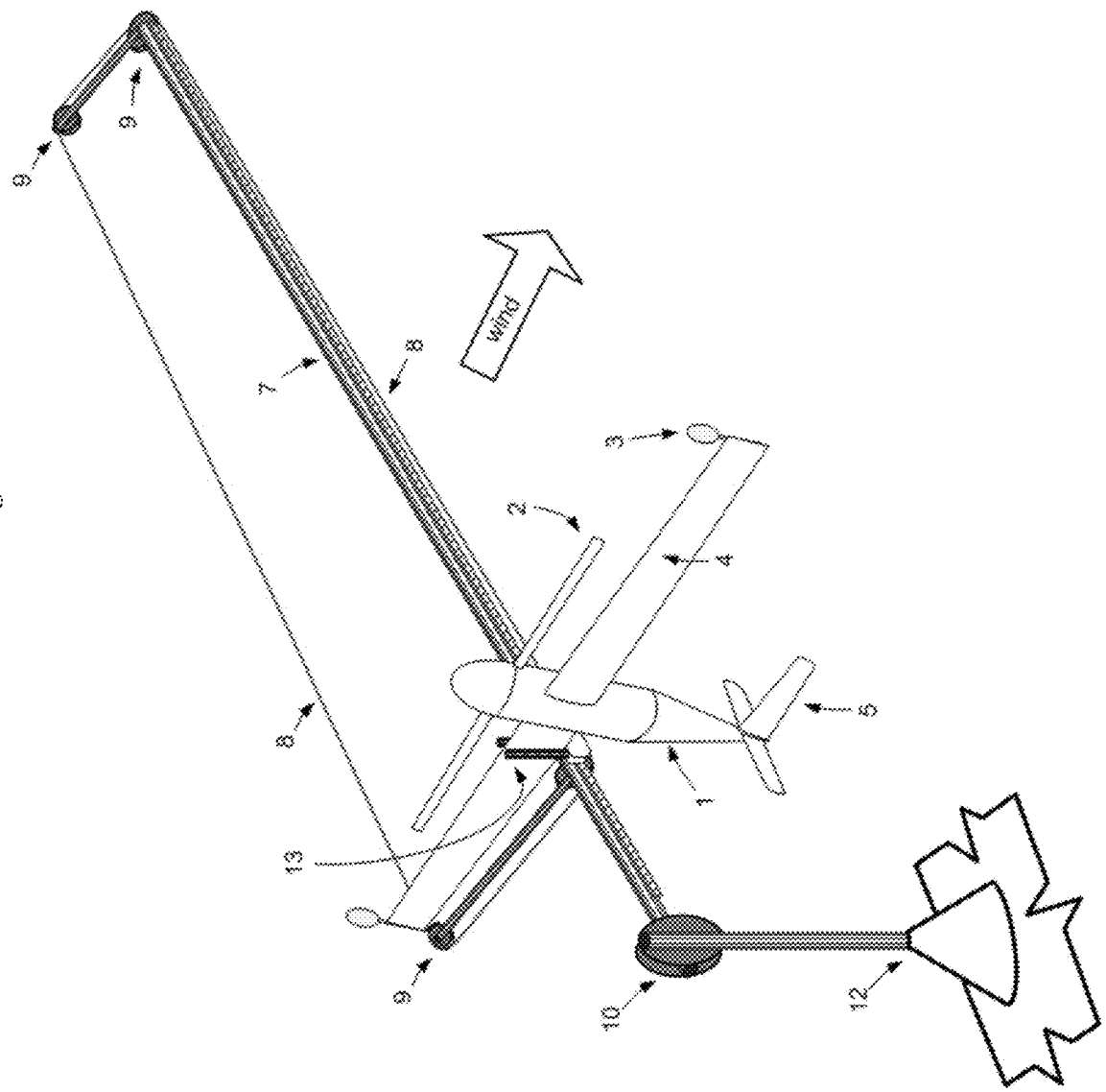
FIG. 9 shows the aircraft parked at the proximal end of the boom of FIG. 6, having been escorted to this position by the clothesline and gripper.
Figure 12:
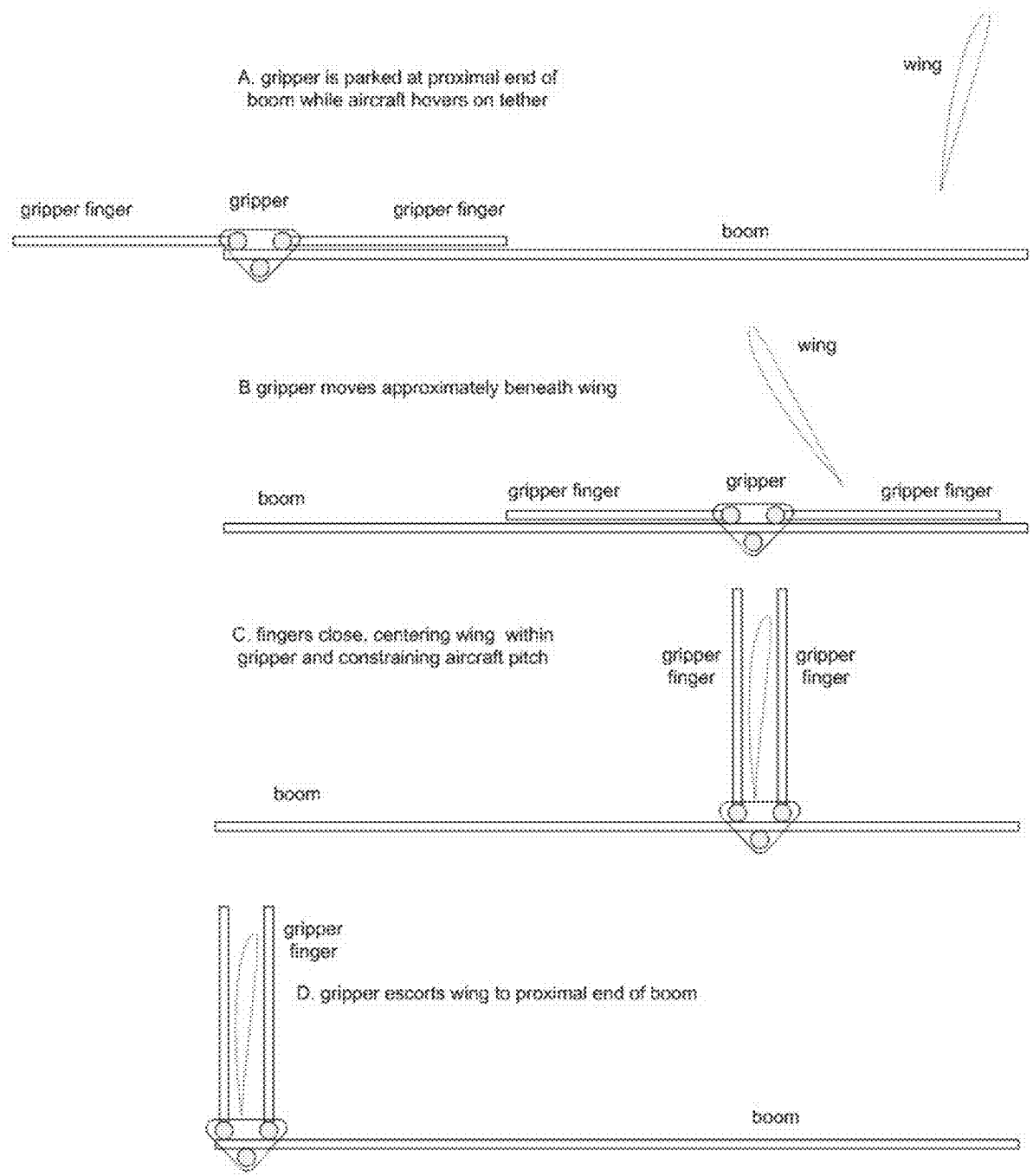
FIG. 12 shows the gripper, wing, and boom of FIG. 6 in sectional view, successively in positions corresponding to those of FIG. 6 through FIG. 9.

FIG. 6 through FIG. 11 illustrate another embodiment of the aircraft retrieval and launch apparatus of the present disclosure that is configured fully to constrain the aircraft as it approaches the docking station, thereby reducing the risk of fouling. Approach, contact, and snagging of the line proceed as in FIG. 1 through FIG. 3, leaving the aircraft 1 in tethered hover as shown in FIG. 6. The aircraft is then escorted by the line 8 to the distal end of the boom 7, and a gripper 13 is positioned, as shown in FIG. 12B, in preparation for grasping the wing 4. The boom twists about its longitudinal axis such that the wing moves down and upstream as shown in FIG. 7, and the gripper may move axially along the boom such that it remains approximately centered below the wing trailing edge. When the relative positions are suitable, the gripper closes on the wing as shown in FIG. 8. Appropriate adjustment of boom elevation or aircraft thrust then brings the wing trailing edge to the base of the gripper as shown in FIG. 12C. The aircraft is then well constrained in all axes, and its engine can be shut down. Having secured the aircraft at the distal end of the boom, the gripper and line can escort the aircraft to the proximal end for servicing as shown in FIG. 9 and FIG. 12D.

Figure 10:
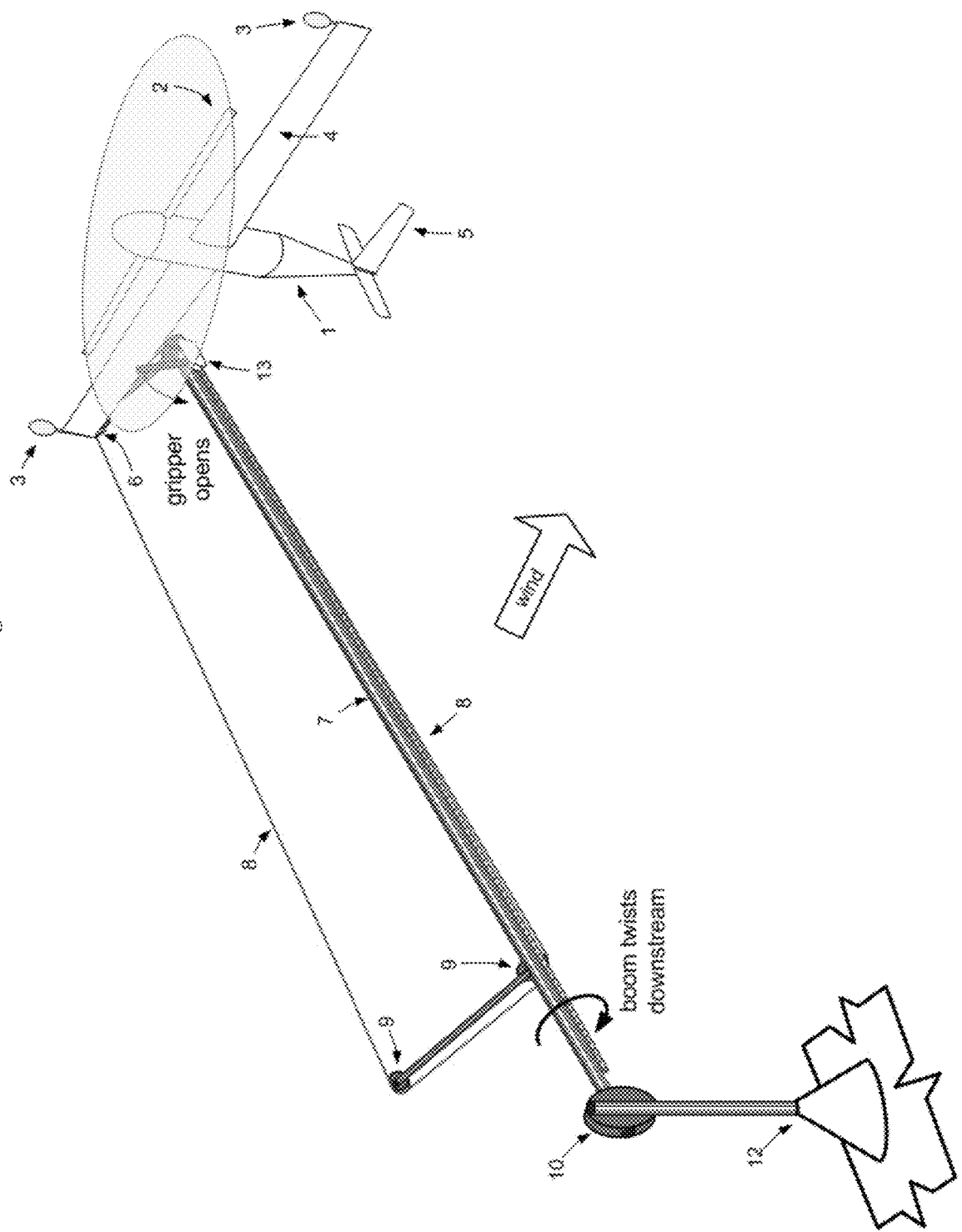
FIG. 10 shows the aircraft in position for release into free flight, having had its engine started, and been moved to the distal end of the boom of FIG. 6 by the clothesline and gripper. The gripper is opening while twisting of the boom guides the aircraft upward and downstream.
Figure 11:
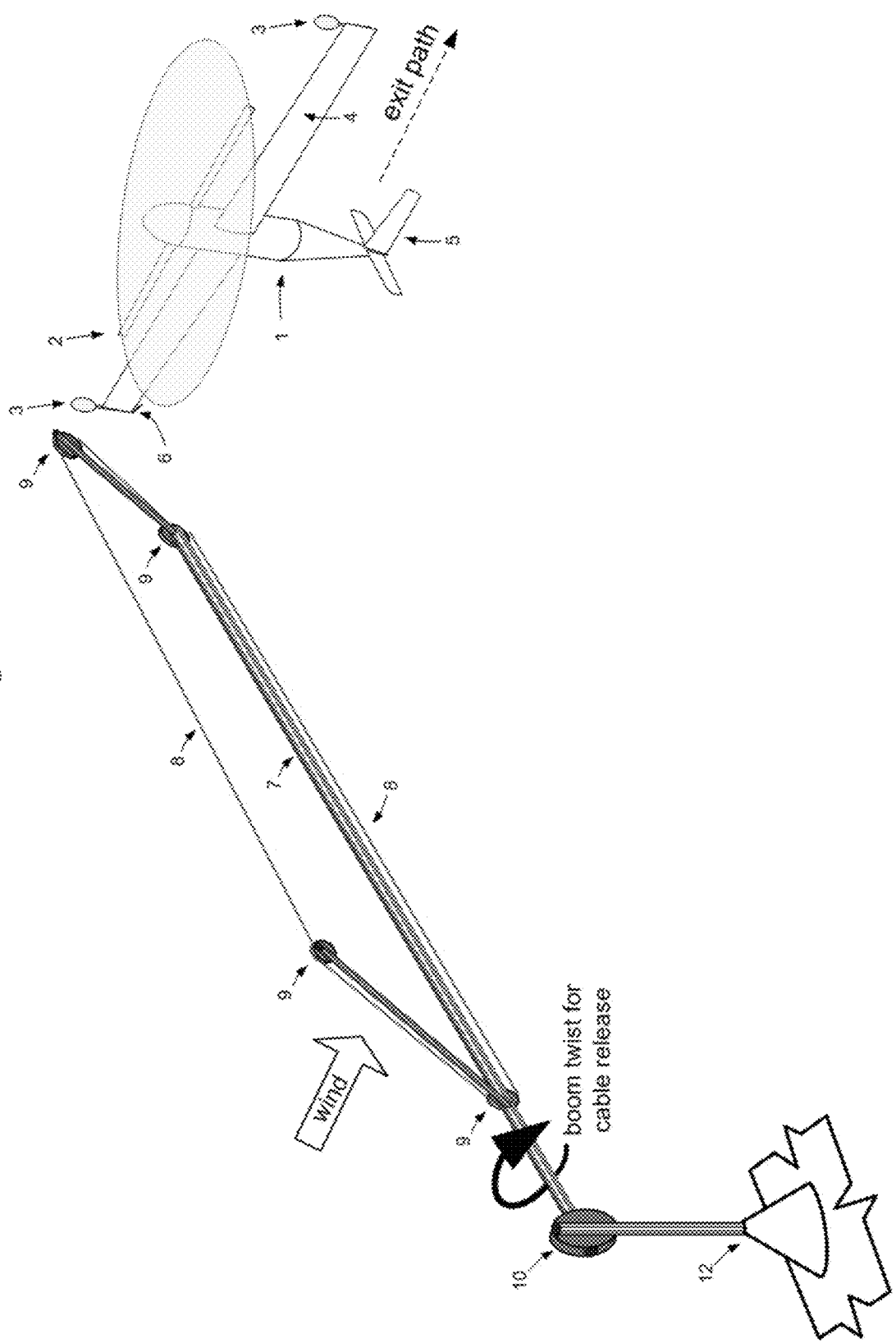
FIG. 11 shows the aircraft moving clear of the boom FIG. 6 after being released into free flight.

For launch the engine is started, and the gripper and line escort the aircraft to the distal end of the boom as shown in FIG. 10. The capture procedure is then reversed; the gripper opens, and the aircraft is guided upward and downstream by gradual twisting of the boom about its longitudinal axis. Again, available climb rate can be estimated while the aircraft maintains tethered hover, with the aircraft proceeding into free flight, as in FIG. 5 and FIG. 11, if the estimated climb rate is satisfactory.

FIG. 13 shows another embodiment of the aircraft retrieval and launch apparatus of the present disclosure in which the wingtip cleat 6 is used in combination with an undercarriage on the aircraft 1—in this case formed by the rear fuselage opening into a set of legs 16. A lightweight pole 14, flexible in bending, replaces the boom and line of the embodiments discussed above with respect to FIG. 1 through FIG. 12D. This embodiment particularly addresses the problem of launch and retrieval in wind of sufficient strength or variability that the aircraft cannot hold position satisfactorily over a target helipad while in free flight.

The aircraft approaches, as in FIG. 1, downwind and parallel to the side of its base ship. The aircraft's legs 16 are stowed. As the tail of the aircraft 5 crosses downwind of the pole 14, the pole is quickly elevated into contact with the trailing edge of the upstream wing 4, and slides into a wingtip cleat 6 as in the other embodiments discussed above with respect to FIG. 1 through FIG. 12D. The cleat in this case allows sliding along the pole, as through a carabiner. Downwind motion of the aircraft then causes the cleat to move along the pole until sliding is stopped by a suitable pole-end fitting 15. The aircraft is thus placed in tethered hover at a constrained radius along the pole. The pole can then be rotated azimuthally about its base until its distal end is positioned over the desired landing point; the aircraft is naturally constrained to follow. When the target azimuth is established, the aircraft can open its legs, descend into contact, and shut down. The aircraft might then be pulled by the pole radially inward into a docking station.

For launch the engine can be started, and the aircraft placed in the landing position. It can then lift into tethered hover, following the pole as the pole is elevated to a desired height. Again, hover power can be observed, and an estimate made for available climb rate. If the available rate is unsatisfactory then the aircraft can be brought back to landing. Otherwise the pole can be swung azimuthally to position the aircraft alongside the ship with a clear exit path. The cleat can then be released, leaving the aircraft to climb away.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for launching an aircraft from free thrust-borne flight, the method comprising:
   (a) lifting-off the aircraft into hovering flight while a capture device of the aircraft is engaged to a line of an aircraft launch apparatus;
   (b) moving the line such that the aircraft is guided into a launch position; and
   (c) disengaging the capture device of the aircraft from the line such that the aircraft is released into free thrust-borne flight.

2. The method of claim 1, which is performed automatically.

3. The method of claim 1, which includes estimating, by a controller, power required for free thrust-borne flight from measurements made while the capture device of the aircraft is engaged to the line.

4. The method of claim 1, wherein disengaging the capture device of the aircraft from the line includes translating the line normal to a longitudinal axis of the line with acceleration greater than said aircraft can follow.

\* \* \* \* \*